Jan. 8, 1929.
R. N. THOMAS ET AL
1,698,325
REVERSING MOTOR CONTROL SYSTEM
Filed May 12, 1926
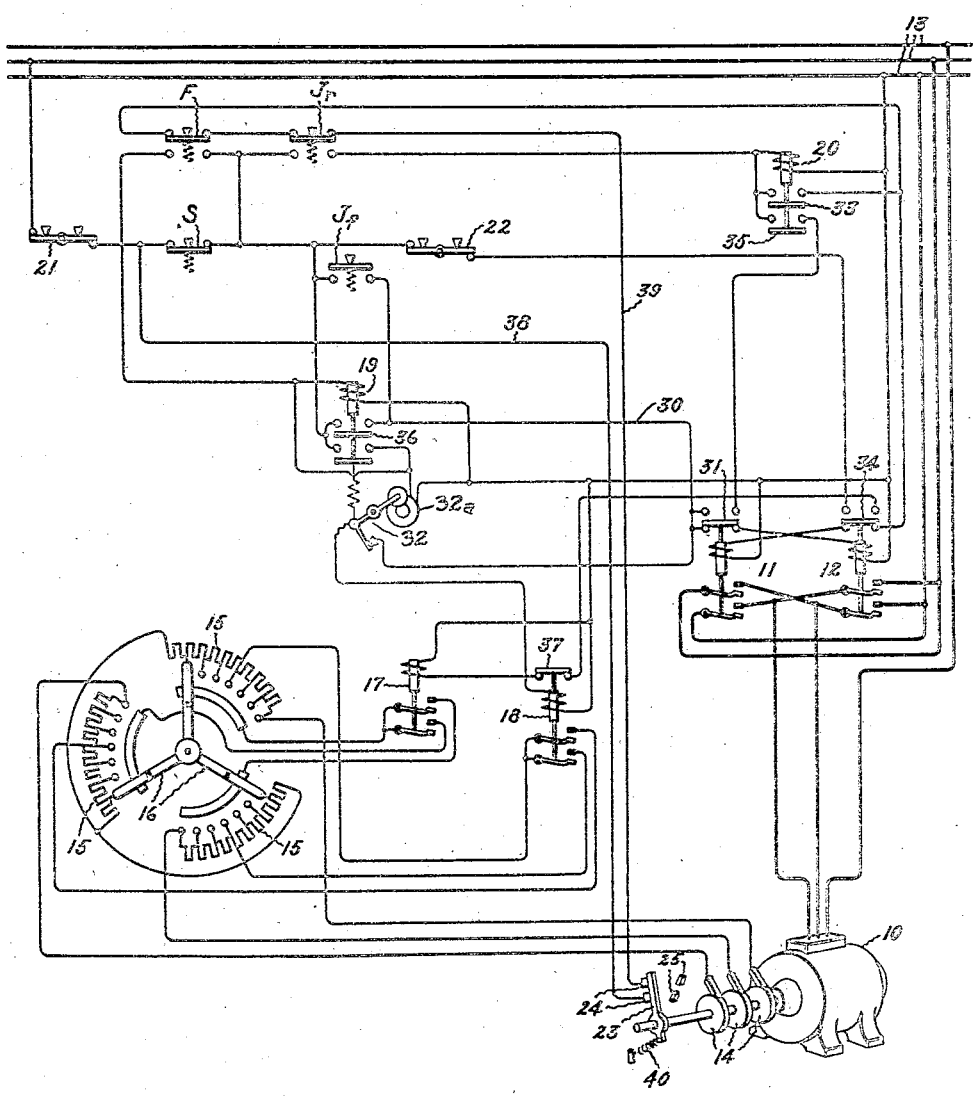
Inventors:
Roy N. Thomas,
George H. Dorgeloh,
by
Their Attorney.

Patented Jan. 8, 1929.

1,698,325

UNITED STATES PATENT OFFICE.

ROY N. THOMAS AND GEORGE H. DORGELOH, OF EAST ORANGE, NEW JERSEY, ASSIGNORS TO GENERAL ELECTRIC COMPANY, A CORPORATION OF NEW YORK.

REVERSING MOTOR-CONTROL SYSTEM.

Application filed May 12, 1926. Serial No. 108,628.

This invention relates to the control of reversible electric motors, particularly such as are employed in printing press drive or other similar service where it is desired to jog the motors in either direction and to operate the motors continuously only in the forward direction.

The principal object of the invention is an improved arrangement of controlling apparatus and circuits for selectively jogging a reversible motor with a predetermined torque in either direction, as well as accelerating the motor to a higher continuous running speed in the forward direction and which moreover automatically provides for quickly stopping the motor after operation at both jogging and running speed in the forward direction without the aid of frictional or other mechanical brakes.

Briefly, in carrying our invention into effect in a preferred form, suitable for alternating current induction motor service, a speed regulating resistor is connected in circuit with the secondary windings of the motor and electroresponsive switches are provided for controlling the resistance and also the power connections of the motor. The electroresponsive switches are arranged to be controlled by suitable forward jog and reverse jog master switches or push buttons so as to jog the motor in either direction and a separately operable forward push button and a stop push button are arranged to control the operation of the motor at the higher continuous running speed in the forward direction. In order to quickly stop the motor after running or jogging operation in the forward direction, our improved control apparatus is arranged to automatically establish reverse power connections to electrically brake the motor substantially to a standstill, the reverse power connections being interrupted by a suitable automatic switch to prevent the motor from operating in the reverse direction after it comes to rest.

With a reversible motor control system embodying the preferred form of our present invention, the jogging of the motor in either direction or the continuous running of the motor in the forward direction is easily accomplished simply by pressing the proper push button and the automatic reversal of the motor power connections after both jogging and continuous running operation in the forward direction quickly brings the motor to rest and thereby eliminates the necessity of a friction or other mechanical brake.

Various other advantageous features of our present invention will be pointed out in the following description of the accompanying drawing in which the single figure is a schematic diagram of a printing press reversible motor control system embodying a preferred form of the invention.

As shown in the drawing, the motor 10 is of the three phase induction type and receives power through one of the reversing switches 11 and 12 from the three phase power source 13. While not shown in the drawing, it will be understood that the shaft of motor 10 is suitably connected to drive a load such, for example, as a printing press. The induction motor 10 is of the well known phase wound type having connections brought out from the rotor winding to the slip rings 14 through which the speed-regulating resistors 15 are connected in circuit with the motor. The adjustable three-arm switch 16, together with the cooperating electroresponsive switch 17 are provided for controlling the amount of the resistances 15 that remains in the secondary circuit of the motor during continuous forward running operation. The electroresponsive switch 18 serves to remove a predetermined portion of the resistors 15 from the secondary circuit during jogging operation as well as during the starting of the forward running operation of motor 10, the remaining portion of the resistors 15 being of suitable value to produce a relatively high motor starting torque.

The operation of the electroresponsive reversing switches 11 and 12 and also the operation of the resistance controlling switches 17 and 18 is under the control of the several manually operated control switches or push buttons indicated as F, S, $J_r$ and $J_f$. The push buttons F and S operate through the agency of the relay 19 to control the forward running operation of the motor 10 with an adjustable amount of the resistors 15 removed from the secondary circuit of the motor to produce the desired operating speed. The control button $J_r$, in conjuction with the relay 20, controls the connection of the motor 10 to the supply line for jogging operation in the reverse direction with the predetermined portion of the speed-regulating resistors 15 in the secondary circuit of the motor to produce high torque jogging operation thereof.

The forward jogging operation of motor 10 at high torque is controlled by the button $J_t$.

If desired, the safety switch 21, as well as the speed-limiting switch 22, may be employed to respectively insure against operation of the motor 10 under certain conditions and to limit operation thereof to slow speed.

For the purpose of obtaining a quick stop of motor 10 after both jogging and running operation in the forward direction, particularly at running speed, the automatic switch 23 is connected to cooperate with the several previously mentioned control push buttons so as to automatically effect operation of reversing switch 11 to establish reverse power connections for motor 10 with all of the speed-regulating resistors 15 in the secondary circuit and thereby electrically brake the motor 10 to standstill. As diagrammatically shown in the drawing, the automatic switch 23 is mounted upon the shaft of motor 10 so as to close the contacts 24 when the motor is rotated in the forward direction and to engage with the stops 25 when the direction of rotation of motor 10 is reversed. This may be accomplished by mounting the switch 23 in frictional engagement with the shaft of motor 10, as illustrated, so that rotation of the motor shaft tends to carry the switch 23 along with the shaft upon rotation thereof in either direction. The spring 40 is provided for slightly biasing the switch 23 into engagement with the stops 25 so that the switch 23 disengages the contacts 24 just prior to a reversal in the direction of rotation of motor 10, as will be pointed out more fully hereinafter. Although not shown in the drawing, the automatic switch 23 may be constructed in the manner described and claimed in the copending application Serial No. 75,147, filed December 12, 1925, by George R. Townsend and assigned to the assignee of our present invention, although other suitable forms of automatic switches may be employed if desired.

The cooperating relation between the several elements of the control system illustrated may be more fully perceived from a description of the operation thereof, which is as follows: Forward jogging operation of motor 10 is initiated by closure of the push button $J_t$. This establishes an energizing circuit for the forward reversing switch 12 extending from the middle supply line 13 through the safety switch 21, the stop push button S, the button $J_t$, the conductor 30, auxiliary switch 31 on switch 11, thence through the operating winding of switch 12 to the lower supply line 13. Switch 12 at once closes to connect the motor 10 to the supply line 13 for operation in the forward direction. At the same time the resistance controlling switch 18 is energized through a circuit extending from the conductor 30, through the normally closed contact of time element interlock 32 associated with switch 19, and the operating winding of switch 18 to the lower supply line 13. Thus, switch 18 closes simultaneously with or soon after closure of reversing switch 12 to remove a predetermined portion of the resistors 15 from the secondary circuit of the motor and thereby insure that the motor 10 exerts sufficient torque to start the press from rest. Power is supplied to motor 10 only as long as the jog push button $J_t$ is maintained closed. When the button $J_t$ is released the operating windings of both reversing switch 12 and the resistance control switch 18 are deenergized and the former interrupts the motor power connections and the latter reinserts all of the resistors 15 in the secondary circuit of the motor.

Reverse jogging operation of the motor is accomplished by operating the push button $J_r$ from its biased position in which it is shown to complete an energizing circuit for the reversing relay 20 extending through stop push button S and the safety switch 21. Upon the resulting closure of relay 20 the reversing switch 11 is energized through a circuit including the safety switch 21, stop push button S, push button $J_r$ in its lower position, the contact 33 on relay 20, the interlocking contact 34 of reversing switch 12, and thence through the operating winding of the reversing switch 11 to the supply lines 13. Reversing switch 11 at once responds to establish power connections for operating the motor 10 in the reverse direction. The contact 31 of reversing switch 11, in conjunction with the contact 35 of relay 20, completes an energizing circuit for resistance controlling switch 18 extending through the contact of time limit interlock 32. Consequently, the switch 18 again functions to remove a portion of the resistors 15 from the secondary circuit of motor 10 to insure that there is a sufficiently high torque to start rotation of the printing press in the reverse direction.

When it is desired to run motor 10 continuously in the forward direction the push button F is operated from its biased position in which it is shown to its lower position, thereby energizing the operating winding of relay 19 through a circuit extending from the middle supply line 13 through the safety switch 21, stop switch S, push button F in its lower position and the operating winding of relay 19 to the lower supply line 13. Upon resulting closure of relay 19 the reversing switch 12 is energized through the upper contact 36 of relay 19, contact 31, and the conductor 30. A holding circuit for maintaining the relay 19 energized independently of the push button F is completed upon operation of the relay contact 32 to its upper position. Hence, operation of motor 10 in the forward direction continues after push button F is released. The contact of the time element interlock 32 remains closed for a time interval after the energization of the operating winding of switch 19. The time element interlock 32 is shown as of the form fully described and claimed in the patent of George E. Stack, No. 1,638,372, issued August 9, 1927, to the assignee of our present invention, and operates to open its contact a time interval after the operation of switch 19. As more fully set forth in the above Stack patent, the contact of the time element interlock is connected to the switch 19 through a resilient yielding connection such as the spring indicated in the drawing and is provided with a retarding electromagnet 32$^a$. The magnet is connected to be energized simultaneously with the energization of the operating winding of switch 19. The pulsating attractive action of the retarding electromagnet 32$^a$ upon the disk armature shown attached to the movable contact of the interlock serves to permit operation of the contact from its normally closed position after a step by step movement of the disk armature across the face of the retarding electromagnet 32$^a$. In this way the energizing circuit for the high torque switch 18 is maintained closed through the contact of the time element interlock 32 for a predetermined time interval after the operation of reversing switch 34 to establish the forward motor connections. Consequently, the switch 18 responds to short circuit the portion of the resistors 15 controlled thereby during the initial starting of motor 10. With the switch 18 energized, contact 37 is held open to maintain the operating winding of switch 17 deenergized. However, upon the elapse of the time interval required to effect the disengagement of the interlocking contact 32, the switch 18 is deenergized and responds to open its resistance controlling contacts and at the same time close contact 37. Thereupon energizing circuit for the switch 17 is completed and the latter responds to short circuit an adjustable portion of the resistors 15 determined by the position of the adjustable switch arm 16. Since the switch arm 16 may be adjusted or preset to remove any desired portion of resistor 15 in the secondary circuit of the motor 10 upon closure of the switch 17, the continuous running speed of motor 10 may be varied to meet varying operating conditions.

With motor 10 operating at a selected continuous running speed in the forward direction a quick stop of the motor upon operation of the stop push button S is accomplished in the following manner: Since the motor 10 is rotating in the forward direction the automatic switch 23 is maintained in engagement with the contacts 24 and thereby completes the circuit extending from the middle supply line 13 through the safety switch 21, the conductor 38, contacts 24 of automatic switch 23, conductor 39 and control switches J$_r$ and F in their upper or biased positions to the lower contact cooperating with the moving contact 34, the reversing switch 12. Hence, upon operation of the said push button S to interrupt the holding circuit of relay 19 and also interrupt the energizing circuit of the forward reversing switch 12 the latter at once returns to the position in which it is shown. This interrupts the forward power connections of the motor 10 and at the same time completes the circuit controlled by the automatic switch 23 and extending through the contact 34 of reversing switch 12 in its open position to the operating winding of reversing switch 11. Thus, upon opening of the forward reversing switch 12, the other reversing switch 11 at once is energized to establish reverse power connections for the motor 10. Since the motor 10, together with the printing press driven thereby, is rotating at substantially running speed in the forward direction, the establishment of the reverse power connections of the motor 10 serves to reverse the electrodynamic torque thereof so that the motor 10 now exerts a torque tending to oppose continued rotation of the motor and the printing press in the forward direction and tending to cause rotation thereof in the reverse direction. During establishment of the reverse power connections of the motor 10 neither of the resistance controlling switches 17 or 18 are energized and, hence, all of the resistances 15 are connected in the secondary circuit of the motor. This serves to limit the opposing torque exerted by motor 10 to a value that will safely and at the same time very quickly bring the motor and the printing press to a stand still. Furthermore, the insertion of all of the resistances 15 in the secondary circuit of the motor 10 prevents the motor from drawing an excessive value of current from the supply lines 13.

As the reversed torque of motor 10 brings the motor and the printing press to rest and just starts to operate the motor and the press in the reverse direction, the automatic switch 23 is operated out of engagement with the contacts 24 and into engagement with the stop 25. By suitable adjustment of the biasing spring 40 the switch 23 can be made to open prior to actual reversal of the motor, if desired. In either case, the opening of switch 23 interrupts the circuit through which the reversing switch 11 is energized and the latter immediately responds to interupt the reverse power connections of the motor.

In case the forward jog push button J$_f$ or the forward running push button F is operated to establish the forward jogging and running motor connections in the manner previously described the automatic switch 23 is moved out of engagement with the stop 25 and returned into engagement with the contacts 24 as illustrated in the drawing. Consequently, upon release of the forward jog push button $J_f$ and the resulting opening of the forward reversing switch 12, the reverse reversing switch 11 again is automatically energized through the circuit including the automatic switch 23, the push buttons $J_r$ and F and the contact 34 of the forward reversing switch 12 to automatically establish the reverse power connections of motor 10 in exactly the same way as just described. Likewise, in case of emergency the stop push button S may be operated during jogging operation in a forward direction and the reverse power braking connections of the motor are established in substantially the same manner as just described. Thus, it will be seen that our improved reversing motor control apparatus insures that the motor is quickly brought to a stop after both jogging operation or running operation in the forward direction.

What we claim as new and desire to secure by Letters Patent of the United States, is:

1. In a motor control system, the combination of a reversible electric motor, a regulating resistor therefor, switch mechanism for establishing power connections and controlling said resistor to operate the motor at low speed in either direction and at high speed in a predetermined direction, and an automatic switch and connections controlled thereby for automatically completing reverse power connections after operation of the motor at both low and high speed in said predetermined direction to electrically brake the motor substantially to a standstill with all of said resistor in circuit therewith.

2. In a motor control system, the combination of a variable speed reversible electric motor, a speed-regulating resistor in circuit therewith, switch mechanism for establishing power connections and controlling the said resistor to operate the motor at low speed in one direction with a predetermined portion of said resistor in circuit therewith and at both low and high speed in the other direction with different predetermined portions of said resistor in circuit therewith, and an automatic switch and connections controlled thereby for automatically establishing connections in said one direction to electrically brake the motor substantially to standstill with all of said resistor in circuit therewith after operation thereof at both low and high speed in said other direction.

3. In a motor control system, the combination of a variable speed reversible electric motor, electroresponsive switches for establishing power connections and controlling the operating speed of the motor in each direction, a plurality of separately operable control switches connected to control the energization of said electroresponsive switches to accelerate the motor to a predetermined low speed in one direction, and to both low and high speed in the other direction, one of said control switches being operable to stop the motor when operating at both low and high speed in said other direction, and an automatic switch connected to control the energization of said electroresponsive switches to automatically establish minimum speed power connections in said one direction to electrically brake the motor substantially to standstill upon operation of said stopping control switch during operation of the motor at both low and high speed in said other direction.

4. In a motor control system, the combination of a variable speed reversible motor, a speed-regulating resistor in circuit therewith, separately operable electroresponsive reversing switches for the motor, separately operable electroresponsive switches for controlling said resistor to operate the motor at different speeds, a plurality of control switches, one connected to control the energization of said electroresponsive switches to jog the motor in the reverse direction with a predetermined portion of the resistor in circuit therewith, a second connected to control the energization of said electroresponsive switches to jog the motor in the forward direction with said predetermined portion of the resistor in circuit therewith, a third connected to control the energization of said electroresponsive switches to accelerate the motor to a higher continuous running speed in the forward direction, and a fourth connected to control the energization of said electroresponsive switches to stop the motor during both jogging and continuous running operation in the forward direction, and an automatic switch connected to cooperate with said control switches in controlling the energization of said electroresponsive switches to automatically establish minimum speed power connections in the reverse direction to electrically brake the motor substantially to standstill upon operation of said stopping switch during both jogging and continuous running operation of the motor in the forward direction.

5. In a motor control system, the combination of a variable speed reversible motor, electroresponsive switches for establishing connections to accelerate the motor to each of a plurality of speeds in a predetermined direction, electroresponsive switches for establishing connections to operate the motor at a predetermined speed in the reverse direction, and an automatic switch connected to automatically effect operation of said electroresponsive switch to establish minimum speed connections in the reverse direction to electrically brake the motor substantially to stand still upon the operation of said first electroresponsive switches to interrupt the connections for operation of the motor at each of said plurality of speeds in the said predetermined direction.

6. In a push button motor control system, the combination of a variable speed reversible electric motor, a speed-regulating resistance in circuit therewith, electroresponsive switches for connecting the motor to a source of supply for operation in a forward and a reverse direction and for controlling said resistor to operate the motor at a jogging speed with a predetermined portion of said resistor short circuited and at a running speed with a different portion of said resistor short circuited, separately operable push buttons for controlling said electroresponsive switches including a forward jog button, a forward run button, a reverse jog button and a stop button, and an automatic switch arranged to be actuated responsively to reversal of the motor and connected to cooperate with said control push buttons to automatically effect operation of said electroresponsive switches to establish the reverse connections to brake the motor substantially to standstill with all of said resistor in the motor circuit after both running and jogging operation thereof in the forward direction.

In witness whereof, we have hereunto set our hands this 10th day of May, 1926.

ROY N. THOMAS.
GEORGE H. DORGELOH.